United States Patent
Gottlieb et al.

(12)

(10) Patent No.: US 10,221,791 B2
(45) Date of Patent: Mar. 5, 2019

(54) METHOD FOR OPERATING A COMBUSTION ENGINE FOLLOWING A COLD START

(71) Applicant: Robert Bosch GmbH, Stuttgart (DE)

(72) Inventors: Stefan Gottlieb, Hemmingen (DE); Volker Ricken, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/801,625

(22) Filed: Nov. 2, 2017

(65) Prior Publication Data
US 2018/0128196 A1    May 10, 2018

(30) Foreign Application Priority Data
Nov. 8, 2016    (DE) .................. 10 2016 221 847

(51) Int. Cl.
*F02D 41/00* (2006.01)
*F02D 13/00* (2006.01)
(Continued)

(52) U.S. Cl.
CPC ....... *F02D 41/064* (2013.01); *F02D 13/0261* (2013.01); *F02D 41/0007* (2013.01);
(Continued)

(58) Field of Classification Search
CPC .. F02D 41/064; F02D 41/007; F02D 41/0255; F02D 41/3023; F02D 41/401;
(Continued)

(56) References Cited

U.S. PATENT DOCUMENTS 4,221,197 A * 9/1980 Kuroda ............... F02D 13/0215
123/316
5,626,117 A * 5/1997 Wright ............... F02D 41/0255
123/406.55
(Continued)

FOREIGN PATENT DOCUMENTS

DE    102009012336 B3    7/2010
DE    102007056216 B4    2/2016

*Primary Examiner* — Thomas Moulis
(74) *Attorney, Agent, or Firm* — Norton Rose Fulbright US LLP; Gerard Messina

(57) ABSTRACT

A method for operating a combustion engine after a cold start, the combustion engine including a supercharger device, a plurality of combustion chambers, a fuel-injection device injecting into each of the combustion chambers, and a gas-exchange valve control device that controls gas-exchange valves in a variable manner. A rich fuel-air mixture is generated in the combustion chambers, and the combustion-chamber charges are ignited in a retarded manner. Following the cold start, the combustion engine is operated with first valve overlaps that are greater than in a warm combustion engine. A first exhaust valve of a first combustion chamber is initially closed at such a late point that its opening duration overlaps with the opening duration of a second exhaust valve of a second combustion chamber that directly follows the first combustion chamber in the ignition sequence and that discharges into the same exhaust manifold as the first combustion chamber.

9 Claims, 4 Drawing Sheets

(51) Int. Cl.
*F02D 41/06* (2006.01)
*F02D 13/02* (2006.01)
*F02D 41/02* (2006.01)
*F02D 41/40* (2006.01)
*F02P 5/00* (2006.01)
*F02D 41/30* (2006.01)
*F02P 5/15* (2006.01)

(52) U.S. Cl.
CPC ..... *F02D 41/0255* (2013.01); *F02D 41/3023* (2013.01); *F02D 41/401* (2013.01); *F02D 41/402* (2013.01); *F02P 5/00* (2013.01); *F02P 5/1502* (2013.01); *F02P 5/1506* (2013.01); *F02D 2013/0292* (2013.01); *F02D 2041/001* (2013.01)

(58) Field of Classification Search
CPC ........... F02D 41/402; F02D 2013/0292; F02D 2041/001
See application file for complete search history.

(56) References Cited

U.S. PATENT DOCUMENTS

| | | | |
|---|---|---|---|
| 8,833,058 B2* | 9/2014 | Ervin | F02D 41/0245 60/287 |
| 9,194,311 B2* | 11/2015 | Shane | F02D 41/0002 |
| 2016/0131046 A1* | 5/2016 | Leone | F02B 37/004 60/600 |

* cited by examiner

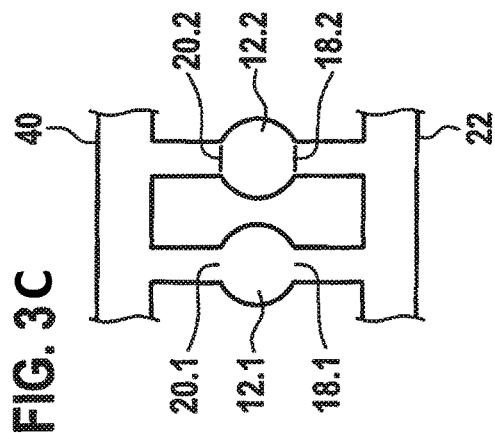
FIG. 3A
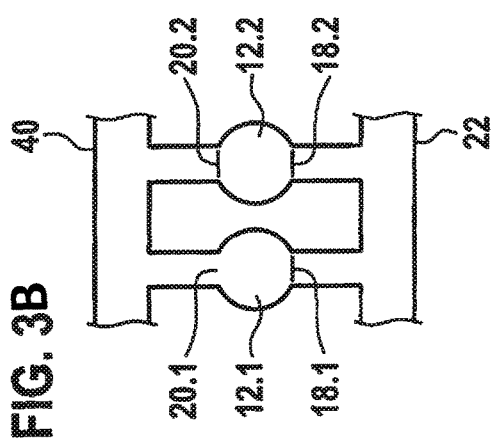
FIG. 3B
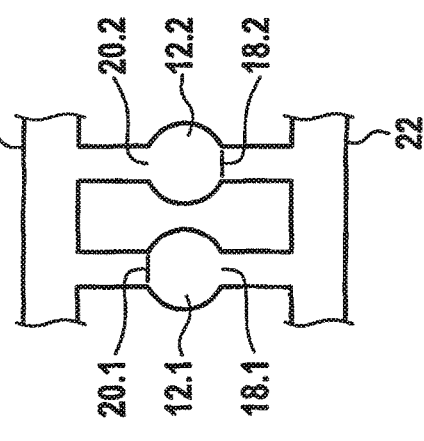
FIG. 3C
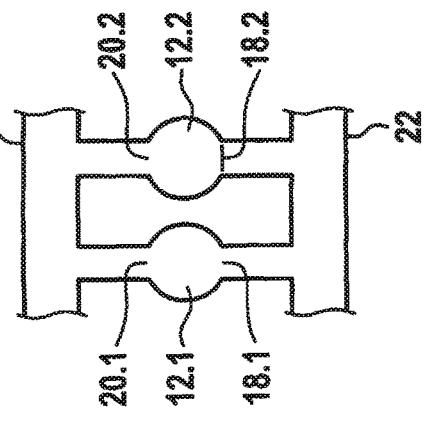
FIG. 3D
FIG. 3E

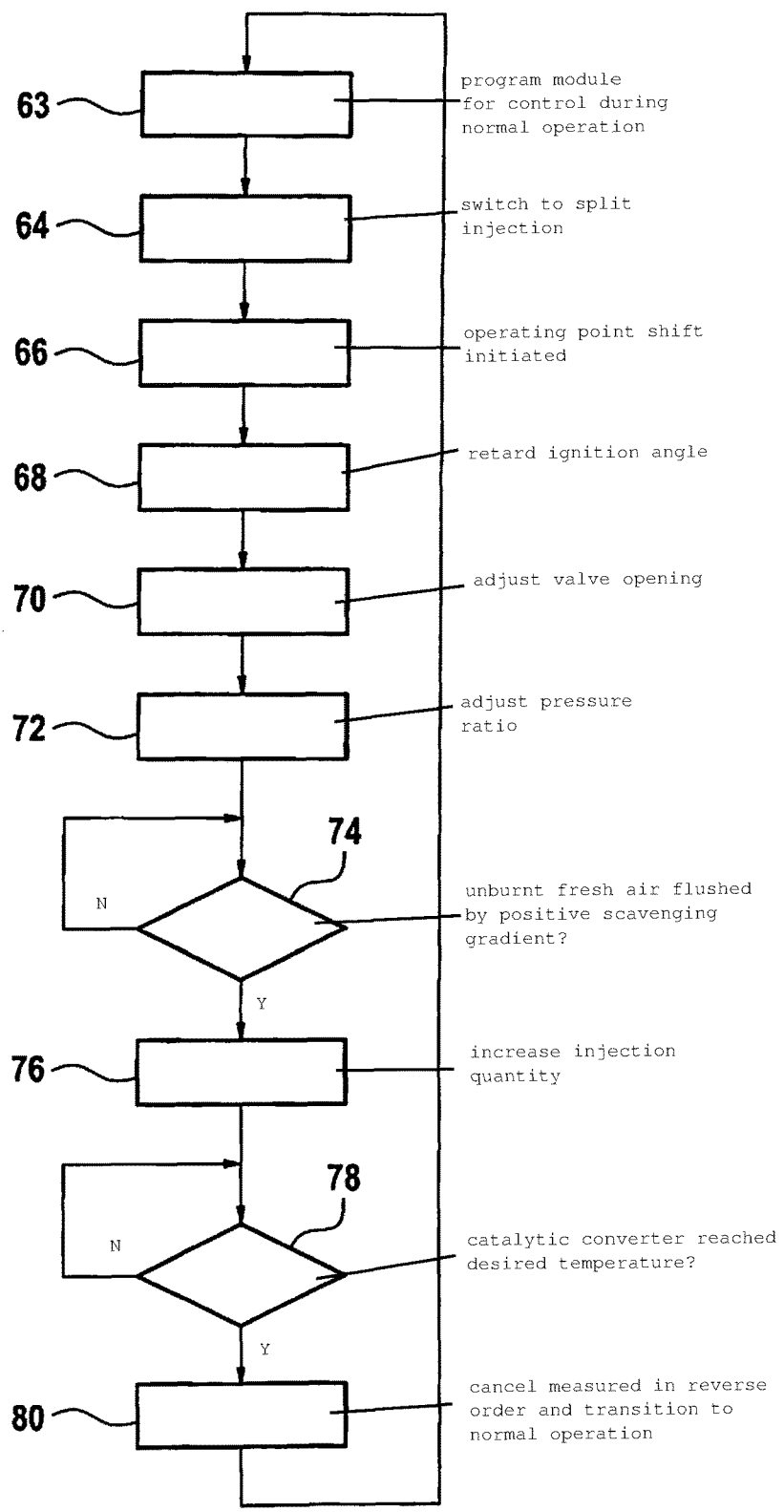

METHOD FOR OPERATING A COMBUSTION ENGINE FOLLOWING A COLD START

CROSS REFERENCE

The present application claims the benefit under 35 U.S.C. § 119 of German Patent Application No. DE 102016221847.6 filed on Nov. 8, 2016, which is expressly incorporated herein by reference in its entirety.

BACKGROUND INFORMATION

The present invention relates to a method for operating a combustion engine following a cold start. The combustion engine has a supercharger device, at least two combustion chambers, a fuel-injection device, which injects directly into each combustion chamber at least once per working cycle, and a gas-exchange valve control device, which controls gas-exchange valves in a variable manner. After the cold start, a rich fuel-air mixture is generated in the respective combustion chamber using the fuel quantity that is injected per working cycle. The combustion-chamber charges produced in this manner are ignited at a later point in the respective working cycle than charges of the same combustion chambers in a combustion engine that has reached its operating temperature, all other conditions being equal. After the cold start, the combustion engine is also operated with first valve overlaps of intake-valve openings and discharge-valve openings of one of the combustion chambers in each case that are greater than second valve overlaps of intake-valve openings and discharge-valve openings of the respective combustion chamber adjusted in a combustion engine that has reached its operating temperature. Furthermore, the present invention relates to a control unit according to the definition of the species in Claim 9. Such a method and control unit are described in German Patent No. DE 10 2007 056 216 B4.

The pollutant emissions of gasoline engines are greatly reduced with the aid of a controlled three-way catalytic converter. However, since this catalytic converter starts converting hydrocarbons, carbon monoxide and nitrogen oxides only at a specific operating temperature (light-off temperature), it is important to reach this temperature as quickly as possible after a cold start.

Higher demands are imposed especially by ever more stringent emission regulations mandated by law. For example, in the European approval-driving cycle roughly 90% of the entire cycle emissions are produced within the first 80 seconds.

In an effort to comply with the limit values, an attempt is usually made to heat the catalytic converter as rapidly as possible following a cold start of the combustion engine, for which a variety of methods are employed. The combustion engine is selectively operated at a poor mechanical efficiency for this purpose, so that the greatest possible energy component of the injected fuel is able to be converted into exhaust heat and used for heating the exhaust-gas aftertreatment system.

For support, some engines use a secondary air-injection in their operation, in which more fuel is injected into the combustion chamber than would be required for the stoichiometric conversion. Using an airflow (referred to as secondary air), which is injected into the exhaust manifold with the aid of a special pump, the unburnt fuel is then directly converted into heat in a chemical secondary reaction.

Downsizing concepts are employed to an increasing extent within the framework of the ever more stringent emission and consumption standards. Here, induction engines are replaced by engines featuring a smaller displacement (and possibly a lower number of combustion chambers), supercharging (mostly turbocharging), and a direct gasoline injection. Moreover, in the case of supercharged engines, what is commonly known as scavenging constitutes the state of the art, in which a higher fresh gas charge is able to be achieved by flushing the residual gas from the combustion chambers and increasing the mass flow to the turbine, in particular at low rotational speeds, thereby obtaining a spontaneous engine-power characteristic.

In engines that have combustion chambers with a shared exhaust manifold and ignition angles that are close together (less than or equal to 180°), a temporal overlap of the exhaust-valve opening may occur (especially in the case of 4, 5, 8 and 10-cylinder engines). In order to increase the charges of the combustion chambers, especially at low rotational speeds, a switch to a shortened valve-lifting curve is possible with the aid of an exhaust-valve lift control. This avoids a pushback of burnt residual gas by a combustion chamber that discharges in parallel.

A method for heating a component of an exhaust-gas aftertreatment device of a combustion engine is described in German Patent No. DE 10 2009 012 336 B3. This combustion engine has a gas-exchange valve control by which a closing of at least one exhaust valve of a combustion chamber is alternatively able to be set to an advanced or retarded closing instant. During a normal operation of the combustion engine and during the overlap phase of the gas-exchange valves of a first combustion chamber, the exhaust valve of a second combustion chamber that discharges into the same exhaust manifold as the first combustion chamber and that follows the first combustion chamber in the ignition sequence, is opened. The opening generates a pressure surge in the exhaust manifold. This pressure surge counteracts a flow of air from the first combustion chamber into the exhaust manifold, which is undesirable during a normal operation since it increases the pressure in the exhaust manifold. For an operation that takes place after a cold start, and thus before a normal operation with a combustion engine that has reached the operating temperature, this related art does not provide for the described opening of the second exhaust valve, which takes place during the valve overlap in the first combustion chamber. As a result, the described pressure surge is omitted, and an entry of air or of air and fuel into the exhaust manifold takes place. Through exothermal reactions of the fuel with the air, a component of the exhaust-gas system, e.g., a catalytic converter or a particle filter, is meant to be heated.

There is still a need for operating strategies aimed at more rapid heating of the exhaust-gas system of a supercharged gasoline engine.

SUMMARY

The present invention differs from the most recently cited related art by the characterizing features of Claim 1. Because after the cold start, the combustion engine is operated with first valve overlaps of intake-valve openings and exhaust-valve openings of one of the respective combustion chambers that are greater than second valve overlaps of intake-valve openings and exhaust-gas valve openings of the respective combustion chamber that are adjusted in a combustion engine that has reached its operating temperature, a so-called scavenger effect comes about. The scavenger effect causes fresh gas to be discharged directly into the exhaust manifold towards the end of the exhaust stroke after the burnt mixture has been discharged.

Since in working cycles of the combustion engine following a cold start at least one first exhaust valve of at least one first combustion chamber is initially closed at such a late point that its opening duration overlaps with the opening duration of a second exhaust valve of a second combustion chamber that immediately follows the first combustion chamber in the ignition sequence and that discharges into the same exhaust manifold as the first combustion chamber, hot combustion exhaust gas that still contains unburnt fuel due to the richer combustion-chamber mixture flows from the second combustion chamber under high pressure into the exhaust manifold. There, it meets air that flows out of the first combustion chamber and into the exhaust manifold as a result of the scavenging effect. In this particular application, this effect is also referred to as cross-talk.

Pressure fronts of the exhaust gas and the air make contact with one another in the exhaust manifold with opposite propagation directions. Resulting turbulence leads to an intensive mixing of the hot exhaust gas, which still contains unburnt fuel, with the air, thereby allowing for an exothermal chemical secondary reaction in the exhaust manifold, which results in a very hot exhaust-gas flow and thus in rapid heating of the catalytic converter.

This operating strategy combines a number of advantages. For one, the rich mixture in the combustion chamber stabilizes the combustion at retarded ignition angles, so that very late ignition angles featuring higher exhaust-gas enthalpy are able to be realized, thereby allowing for more rapid heating of the exhaust-gas system. The torque loss resulting from the retarded ignition is balanced by a greater combustion-chamber charge, which results in a greater exhaust-gas mass flow, which likewise contributes to faster heating. In addition, the rich mixture produces very low raw emissions of nitrogen oxide, which is relevant especially in connection with the more recent exhaust-gas regulations. Through the direct chemical post-oxidation, the unburnt fuel is already completely converted in the manifold into thermal energy, which may be used for heating the exhaust-gas tract.

The present invention thus achieves rapid heating of the catalytic converter by a combination of the following four measures: Generating a positive scavenging gradient (intake-manifold pressure greater than exhaust-gas backpressure) with a long valve overlap (simultaneous opening of intake and exhaust valves), and thus the discharging of oxygen-rich fresh air from the induction system into the manifold; enriching (fuel excess vis-à-vis stoichiometric mixture ratio) of the fuel-air mixture coming about in the combustion chambers by their respective air charge and the injection of fuel; controlling the exhaust valves of combustion chambers that are adjacent in the ignition sequence and that discharge into the same manifold in such a way that the described effect of cross-talk in the exhaust manifold is produced; retarding the ignition angle in order to increase the exhaust-gas enthalpy, possibly combined with split/multiple injection(s) in an effort to stabilize the combustion.

With the aid of the present invention, catalytic converters, in particular, are heated more rapidly up to what is known as the light-off temperature, at which the conversion begins. In the warm-up phase that follows a cold start, fewer emissions are produced as an advantageous result. Because of the present invention, a secondary-air system that would otherwise be required for complying with limit values may have smaller dimensions or may even be omitted completely. It may also be the case that a smaller catalytic converter could be used due to the more rapid heating. In combustion engines that feature the afore-described equipment level, the present invention may be realized by a modified software of the engine control unit. Such combustion engines are then able to be operated without constructive modifications with reduced cold-start emissions, and possibly satisfy the more stringent demands of a more advantageous emission category.

In accordance with one preferred refinement of the present invention, first a switch takes place to a split injection, in which a portion of the fuel is injected only in the compression stroke of the combustion chamber.

It is also preferred to initiate an operating-point shift, in which the combustion-chamber charge is increased and the ignition angle is retarded simultaneously or subsequently.

In addition, it is preferred that the gas-exchange valve control device is used to make an adjustment in the valve opening of the second exhaust valve of the second combustion chamber.

In accordance with another preferred refinement of the present invention, the valve opening of the first exhaust valve of the first combustion chamber is adjusted in addition, the adjustment always being implemented in such a way that in the working cycles of the combustion engine following a cold start, at least one first exhaust valve of at least one first combustion chamber is closed at such a late point that its opening duration overlaps with the opening duration of a second exhaust valve of a second combustion chamber that immediately follows the first combustion chamber in the ignition sequence and that discharges into the same exhaust manifold as the first combustion chamber.

It is also preferred that a positive scavenging gradient is adjusted thereafter.

It is furthermore preferred that the injection quantity is increased in step 76 and the mixture enriched as a result.

In accordance with another preferred further development of the present invention, the attained adjustment state of the different final control elements is maintained until a catalytic converter in the exhaust-gas system has reached its light-off temperature, and that the adjustment states of the different final control elements that were attained following the cold start are canceled in the reverse order and a switch is made to the normal operation.

Among other things, in accordance with the control unit according to the present invention, working cycles of the combustion engine following a cold start, the control unit initially closes at least one first exhaust valve of at least one first combustion chamber at such a late point that its opening duration overlaps with the opening duration of a second exhaust valve of a second combustion chamber that immediately follows the first combustion chamber in the ignition sequence and that discharges into the same exhaust manifold as the first combustion chamber.

In accordance with one preferred further development of the control unit, it is designed to control the sequence of at least one of the above-mentioned further developments of the present method.

Additional features and advantages are described herein and are shown in the figures.

It is understood that the aforementioned features and the features still to be discussed in the following text may be used not only in the individually indicated combinations but also in other combinations or on their own without departing from the scope of the present invention.

Exemplary embodiments of the present invention are shown in the figures and discussed in greater detail in the following description. Identical reference numerals in the various figures denote identical elements or elements that are at least equivalent in their functions.

BRIEF DESCRIPTION OF THE DRAWINGS

FIG. 3A shows two combustion chambers together with a shared exhaust manifold and induction system as well as intake and exhaust valves.

FIG. 3B shows two combustion chambers together with a shared exhaust manifold and induction system as well as intake and exhaust valves.

FIG. 3C shows two combustion chambers together with a shared exhaust manifold and induction system as well as intake and exhaust valves.

FIG. 3D shows two combustion chambers together with a shared exhaust manifold and induction system as well as intake and exhaust valves.

FIG. 3E shows two combustion chambers together with a shared exhaust manifold and induction system as well as intake and exhaust valves.

FIG. 4 shows a flow diagram as an exemplary embodiment of a method according to the present invention.

DETAILED DESCRIPTION OF EXAMPLE EMBODIMENTS

Figure 1:
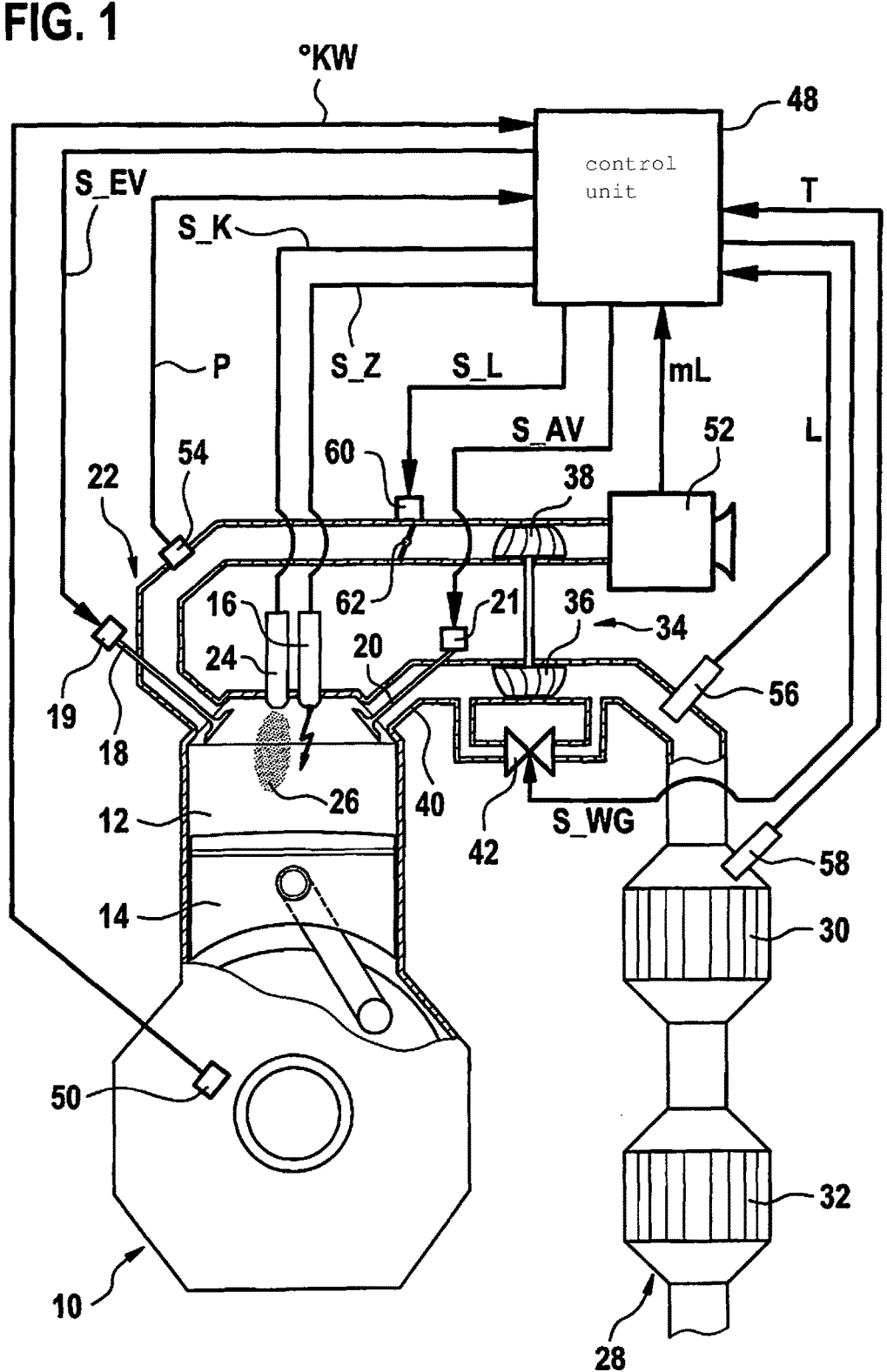
FIG. 1 shows the technical environment of the present invention.

In detail, FIG. 1 shows a combustion engine 10, which has at least one combustion chamber 12 that is movably sealed by a piston 14. Charges of combustion chamber 12 with a mixture of fuel and air are ignited by an ignition device 16 and subsequently combusted.

A change in the charge of combustion chamber 12 is controlled by intake valves 18 and exhaust valves 20, which are opened and closed in phase synchrony with the travel of piston 14. The actuation of intake valves 18 and exhaust valves 20 takes place with the aid of control elements 19 and 21, a control element 19 operating one or more intake valve(s) 18 in each case, and a control element 21 operating one or more exhaust valve(s) 20. Control elements 19, 21 are preferably implemented in the form of electromechanical, electromagnetic, electrohydraulic and electropneumatic control elements or as a combination of such control elements. Known, for example, are camshafts whose phase position relative to a crankshaft is influenced by a control element that is operated by an oil pressure and is electrically controlled. A change in the phase position that leads to an earlier opening of the intake valves (and/or to a later closing of the exhaust valves) then also results in a greater valve overlap.

A valve overlap describes the angular range of a rotary motion of the crankshaft (or camshaft) of combustion engine 10, in which at least one intake valve and at least one exhaust valve of a combustion chamber are both open. Also known are variable valve controls, in which the valve lift is able to be switched or continually modified as an alternative or in addition to a change in the phase position of at least one camshaft, which influences the valve-overlap cross-section, among other things. In this case, the cross-section of the valve overlap is understood as the effective opening cross-section between the induction system and the exhaust-gas system. In the case of an intake valve and an exhaust valve of a combustion chamber that are open at the same time, this denotes the smaller opening cross-section of the jointly open valves 18, 20. The intake valves and the exhaust valves are also known as gas-exchange valves.

The different options for the variable actuation of intake valves 18 and exhaust valves 20 are actually known to one skilled in the art and are not shown in detail in FIG. 1 for reasons of clarity.

When intake valve 18 is open and piston 14 is descending, i.e., during the intake cycle, air flows out of an induction system 22 and into combustion chamber 12. Fuel is metered to the air in combustion chamber 12 via an injector 24. While exhaust valve 20 is open, exhaust gas that results from a combustion of the combustion-chamber charges is discharged into an exhaust-gas system 28, which includes at least one 3-way catalytic converter 30. In general, exhaust-gas system 28 will include a plurality of catalytic converters, e.g., a three-way catalytic converter installed near the engine as a primary catalyst, and a main catalytic converter 32, which is installed at a distance from the engine and may be a three-way catalytic converter or a NOx adsorption catalytic converter.

Combustion engine 10 has an exhaust turbocharger 34 that includes a turbine 36 and a compressor 38. Exhaust turbocharger 34 is a development of a supercharger device. The supercharger device may also be a compressor which is mechanically driven by the combustion engine, an electrically driven compressor, or a combination of both. Turbine 36 is situated in the flow path of the exhaust gases between an exhaust manifold 40 and three-way catalytic converter 30 used as a primary catalyst. The pressure gradient above turbine 36 is able to be restricted with the aid of a waste-gate valve 42. However, the present invention may also be used in connection with turbochargers without a waste-gate valve, e.g., in connection with turbochargers having a variable turbine geometry. In the subject matter of FIG. 1, an introduction of secondary air into exhaust-gas system 28 takes place through a flow of air from induction system 22 by way of at least one intake valve 18 and one exhaust valve 20 of a combustion chamber 12, which are both open during the top dead center charge cycle. Such a flow is created in the presence of a sufficiently large valve overlap or a sufficiently large valve-overlap cross-section, and a simultaneously sufficiently large pressure gradient from induction system 22 (upstream from intake valves 18) in the direction of exhaust-gas system 28 upstream from three-way catalytic converter 30.

Combustion engine 10 is controlled by a control unit 48, which for this purpose processes signals from different sensors in which operating parameters of combustion engine 10 are reproduced. In the non-exhaustive representation of FIG. 1, these are an angle-of-rotation sensor 50, which detects an angle position ° KW of a crankshaft of combustion engine 10, and thus a position of piston 14; an air-mass meter 52, which detects an air mass mL flowing into combustion engine 10; a pressure sensor 54, which detects pressure p in induction system 22 upstream from intake valves 18; and optionally, one or more exhaust-gas sensor(s) 56, 58, which detect(s) a concentration of an exhaust-gas component and/or a temperature of the exhaust gas.

In the development of FIG. 1, first exhaust-gas sensor 56 is a lambda sensor, which detects an oxygen concentration in the exhaust gas as a measure for an excess-air factor L (L=lambda), whereas second exhaust-gas sensor 58 detects an exhaust-gas temperature T at the input of three-way catalytic converter 30 that is used as a primary catalytic converter. As is commonly known, excess-air factor lambda is defined in the numerator as the quotient of an actually available air mass, and in the divisor as an air mass required for a stoichiometric combustion of a specific fuel mass. Excess-air factors lambda that are greater than 1 therefore represent an excess of air, while excess-air factors lambda of less than 1 represent an excess of fuel. If exhaust-gas system 28 includes a second exhaust-gas sensor 58, which serves as a temperature sensor, then the latter may also be positioned at another location of exhaust-gas system 28, e.g., at the input of main catalytic converter 32. This applies in particular in the case that main catalytic converter 32 is a NOx adsorption catalyst.

The signals from these sensors and possibly from additional sensors are used by control unit 48 to generate actuating signals for the actuation of final control elements for the control of combustion engine 10. In the development of FIG. 1, these are especially an actuating signal S_L for actuating a throttle-valve positioner 60 that adjusts the angular position of a throttle valve 62 in induction system 22; a signal S_K, by which control unit 48 actuates injector 24; an actuating signal S_Z, by which control unit 48 actuates ignition device 16, which includes a spark plug, for instance, and which also includes coils and/or capacitors for generating the ignition voltage, for example; and an actuating signal S_EV by which control unit 48 controls the opening cross-section and/or the angular range of the opening of intake valve 18; and/or an actuating signal S_AV, which control unit 48 uses to control the opening cross-section and/or the angular range of the opening of exhaust-valve 20. If a waste-gate valve 42 is provided, this, too, will be controlled by control unit 48. Control unit 48 outputs an actuating signal S_WG for this purpose.

It holds true both for the sensors and for the illustrated final control elements that the illustration in FIG. 1 is not meant to be all-inclusive. Modern combustion engines 10 may be equipped with additional sensors and final control elements either as an alternative or in addition.

Generally speaking, control unit 48 is configured, in particular programmed, to execute the method introduced here and/or one of its further developments, and/or to control a corresponding method sequence. In one preferred further development, control unit 48 converts performance demands placed on combustion engine 10 into a setpoint value for the total torque to be generated by combustion engine 10; it also outputs actuating signals S_L for the charge control, S_K for the fuel metering, S_Z for the ignition control, S_WG for the charge-pressure control, and/or S_EV and/or S_AV for the control of intake valves 18 and/or exhaust valves 20, respectively. The charge is adjusted through a corresponding adjustment of throttle valve 62 by actuating signal S_L or by a control of the opening of the intake valves. The influence of the fuel injection on the torque is adjusted with the aid of manipulated variable S_K, essentially by the injected fuel mass and the type of allotment of the fuel mass to be injected to one or more partial injections, as well as by the relative position of the partial injections with respect to one another and with respect to the travel of piston 14, i.e., through an injection timing. The maximally possible torque at a given air charge results at the optimal excess-air factor lambda, optimal injection timing and optimal ignition angle.

Figure 2:
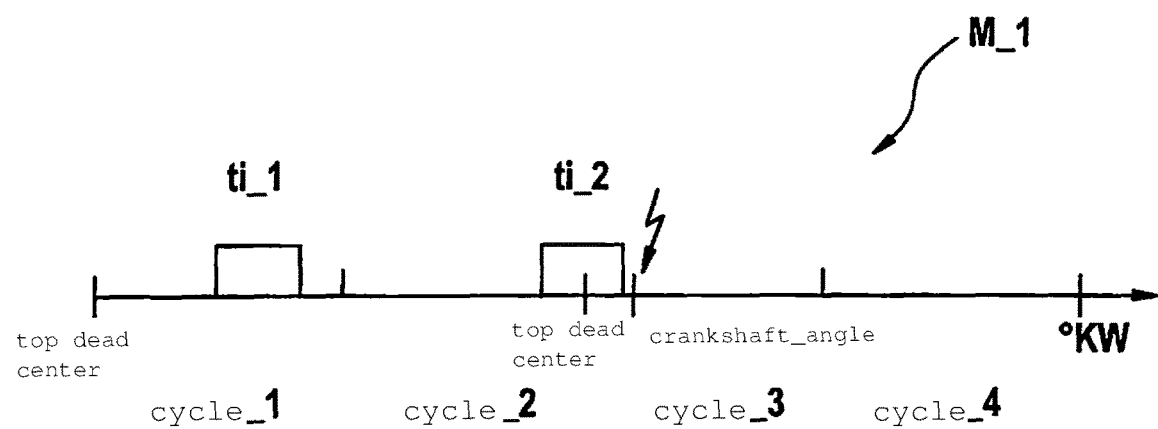
FIG. 2 shows an injection pattern that is used in one further development of the method according to the present invention.

FIG. 2 illustrates an injection pattern that is used in one further development of the method according to the present invention. Plotted here are injection-pulse widths ti_1 of a first partial injection and ti_2 of a second partial injection; they are shown in the form of high levels over crankshaft angle °KW of a working cycle made up of an intake cycle, cycle_1, a compression cycle, cycle_2, a working cycle, cycle_3, and an exhaust cycle, cycle_4. Top dead centers are denoted by OT.

More specifically, FIG. 2 shows an injection pattern M_1 for a homogeneous-split operation for maximized exhaust-gas enthalpy with a first partial injection (injection-pulse width ti_1), which takes place in an intake cycle, cycle_1, and a second partial injection (injection-pulse width ti_2), which takes place later. The second partial injection always precedes the ignition, which is triggered at crankshaft angle KW_Z. Ignition angle KW_Z may possibly lie very late, in the area of 10° to 35° KW after ignition OT [TDC], so that the second partial injection may also lie completely or partially within the working cycle, cycle_3. In any event, it precedes the ignition.

Instead of an allotment to two partial injections, the fuel quantity injected using first injection pattern M_1 may also be split into more than two partial injections. The splitting option is limited by the ability of injector 24 to meter minute quantities. Essential for pattern M_1 is the distribution to at least two partial injections, of which the earlier partial injection (injection-pulse width ti_1) preferably lies in the intake cycle, cycle_1, and the final partial injection (injection-pulse width ti_2) always lies in the same working cycle ahead of the ignition. This produces an excess-air factor lambda in combustion chamber 12 (i.e. without secondary air) of less than 1, and an excess-air factor lambda in the exhaust gas (i.e. with secondary air) 1 that is greater than the excess-air factor in the combustion chamber and which may also be greater than 1.

FIGS. 3A through 3E illustrate the dynamic effects in the exhaust manifold that arise during combustion processes and gas-exchange processes of two combustion chambers 12.1, 12.2 that follow each other in the ignition sequence and discharge into the same exhaust manifold 40. In addition to a respective first combustion chamber 12.1 and a second combustion chamber 12.2, the individual sub-figures 3A through 3E illustrate shared exhaust manifold 40, an induction system 22 that provides air to both combustion chambers, and an intake valve 18.1 and an exhaust valve 20.1 of first combustion chamber 12.1, as well as an intake valve 18.2 and an exhaust valve 20.2 of second combustion chamber 12.2. In FIGS. 3A through 3E, the intake valves and the exhaust valves are shown schematically as lines that lie transversely to the flow through the combustion chambers when the valves are closed. A missing line represents an open valve in each case. The direction of the through-flow runs from induction system 22 to exhaust manifold 40.

In sub-figure 3A, all intake valves 18.1, 18.2 and exhaust valves 20.1, 20.2 of the two combustion chambers 12.1, 12.2 are closed. First combustion chamber 12.1 is in a combustion cycle of a four-stroke cycle, and second combustion chamber 12.2 is in a compression cycle.

In sub-figure 3B, first intake valve 18.1 of first combustion chamber 12.1 is closed while first exhaust valve 20.1 is already open. First combustion chamber 12.1 is in the exhaust cycle. Second intake valve 18.2 and second exhaust valve 20.2 are closed, and second combustion chamber 12.2 is in the combustion cycle.

In sub-figure 3C, intake valve 18.1 and exhaust valve 20.1 of first combustion chamber 12.1 are open, which is referred to as a valve overlap inasmuch as the gas-exchange valves of the same combustion chamber are involved. Due to the charge pressure prevailing in induction system 22, a pressure gradient, referred to as a scavenging gradient, comes about between induction system 22 and exhaust manifold 40, which lets fresh gas flow out of induction system 22 and into exhaust manifold 40. Intake valve 18.2 and exhaust valve 20.2 of second combustion chamber 12.1 are still closed. The first combustion chamber is in the transition from an exhaust cycle to the intake cycle. Second combustion chamber 12.2 is in the transition from a combustion cycle to the exhaust cycle.

In sub-figure 3D, exhaust valve 20.2 of second combustion chamber 12.2 opens while intake valve 18.1 and exhaust valve 20.1 of first combustion chamber 12.1 are still open, and the exhaust gases of the second combustion chamber, which are under a higher pressure, make contact in the direct counter-flow with the fresh gases that are discharged by the first combustion chamber. This state corresponds to the cross-talk defined earlier in the text. First combustion chamber 12.1 is still in the transition from the exhaust cycle to the intake cycle. Second combustion chamber 12.2 is in the exhaust cycle.

In sub-figure 3E, exhaust valve 20.1 of first combustion chamber 12.1 has closed. This combustion chamber is in the intake cycle. Second combustion chamber 12.2 is in the same state as first combustion chamber 12.1 in sub-figure 3B, i.e. in the exhaust cycle.

FIG. 4 shows a flow diagram as an exemplary embodiment of a method according to the present invention. The method according to the present invention is carried out by control unit 48 in that control unit 48 controls the sequence of the method. Block 63 represents a program module for the control of combustion engine 10 during a normal operation.

To initiate accelerated heating of a catalytic converter during a cold start, first an operating-point shift is initiated in step 66 in order to induce the exothermal reaction to be brought about in exhaust manifold 40, which is done by increasing the combustion chamber charge. In an effort to keep the torque constant and to increase the exhaust-gas enthalpy, the ignition angle is retarded in step 68, either simultaneously or subsequently. Optionally, in a step 64, a switch to what is known as a split-injection is made beforehand, in which a portion of the fuel is injected only during the compression cycle of the combustion chamber. The switch to the split-injection made in step 64 contributes to the stability of the combustion, which could be adversely affected by the ignition-angle retardation. Due to the increased charge, a high quantity of exhaust gas is produced, which also has a relatively high temperature on account of the suboptimal ignition-angle efficiency, and which, together with the flow of fresh gas has an oxygen excess even at a stoichiometric or rich combustion-chamber mixture. Overall, a great heat flow or enthalpy flow is generated in this way.

Due to the large enthalpy flow in the exhaust gas as a result of the increase in the combustion-chamber charges, the rotational speed of turbine 36 of exhaust-gas turbocharger 34 is rapidly increased, so that charge pressure p rises. This is advantageous for a subsequent adjustment of a positive scavenging gradient. At a positive scavenging gradient, the pressure difference between the charge pressure on the fresh-air side of combustion chamber 12 (e.g., in excess of 1200 bar) and on exhaust-gas side of combustion engine 12 is large enough to allow fresh air to flow out of induction system 22 via combustion chambers 12 into exhaust-gas system 28 during an open-controlled valve overlap and/or an open-controlled valve-overlap cross-section.

Then, an adjustment of the valve opening of the second exhaust valve of the second combustion chamber is made in step 70, using the gas-exchange valve control device. An adjustment of the valve opening of the first exhaust valve of the first combustion chamber may possibly take place in addition. In all cases, the adjustment takes place in such a way that in the working cycles of the combustion engine following a cold start, at least one first exhaust valve of at least one first combustion chamber is closed at such a late point that its opening duration overlaps with the opening duration of a second exhaust valve of a second combustion chamber that immediately follows the first combustion chamber in the ignition sequence and that discharges into the same exhaust manifold as the first combustion chamber. This corresponds to the aforementioned cross-talk. Control unit 48 controls the valve overlap and/or the valve-overlap cross-section by the output of an open-controlling (i.e. opening) actuating signals S_EV and/or S_AV.

For example, an adjustment of this type may also be achieved by an adjustment of the second exhaust valves. In a gas-exchange valve control device as it is known from the initially cited DE 10 2009 012 336 B3, a back-and-forth switch is possible between two cam forms of a camshaft that actuates the exhaust valves, the cam forms differing in that they lead to cross-talk phases of different lengths. While in DE 10 2009 012 336 B4, the cam form with the shorter or the non-existent cross-talk phase is adjusted for the heating of the catalytic converter, the present invention, in the event that such a device is used, provides for an adjustment of the cam form that produces the most pronounced cross-talk effect after a cold start.

Then, in step 72, a pressure ratio for a positive scavenging gradient is adjusted (15). This is done, for example, by actuating the throttle valve positioner in such a way that throttle valve 62 opens. The adjustment of the positive scavenging gradient is facilitated by the charge-pressure increase triggered by steps 66 and 68.

In step 74, it is verified whether unburnt fresh air is flushed into the exhaust-gas tract by the positive scavenging gradient. This may be accomplished by evaluating the signal from first exhaust-gas sensor 56 inasmuch as the fresh air causes the oxygen content of the exhaust gas to rise and thereby modifies the signal from first exhaust-gas sensor 56, which preferably is an oxygen-sensitive lambda sensor.

Only if this is the case will the injection quantity be increased in step 76 and the mixture enriched as a result. This also results in an excellent ignitability and a stable combustion of the fuel-air mixture enclosed in the combustion chambers. At the same time, the richer than stoichiometric excess-air factor (lambda of less than 1, fuel excess) is required in the combustion chamber in order to achieve, in conjunction with the air flowing from induction system 22 into exhaust manifold 40, a mixture in exhaust manifold 40 that is able to react exothermally.

In step 78, it is verified, for example, whether the catalytic converter has reached the desired temperature, in particular its light-off temperature. This may be accomplished by an evaluation of the signal from second exhaust-gas sensor 58 or by computational modeling of the catalytic-converter temperature. As long as the desired temperature has not yet been reached, the attained adjustment state of the different final control elements will remain unchanged. Given a high torque demand, the ignition-angle retardation may possibly be canceled again, but the other measures remain unaffected by such a step. If the desired temperature is reached, the program branches to step 80, in which the mentioned measures are canceled in a reverse order and a transition takes place to the normal operation that is implemented using main program 63.

What is claimed is:

1. A method for operating a combustion engine following a cold start, the combustion engine having a supercharger device, at least two combustion chambers, a fuel-injection device that injects directly into each combustion chamber at least once per working cycle, and a gas-exchange valve control device that controls intake valves and exhaust valves in a variable manner, whereby a rich fuel-air mixture is produced in the respective combustion chamber by a fuel quantity injected per working cycle, and the combustion-chamber charges produced in this manner are ignited in the respective working cycle at a later point than charges of the same combustion chambers in a combustion engine that has the operating temperature, under otherwise identical conditions, the method comprising:

after the cold start, operating the combustion engine with first valve overlaps of intake-valve openings and discharge-valve openings of one of the combustion chambers in each case, the first valve overlaps being greater than second valve overlaps of intake-valve openings and discharge-valve openings of the respective combustion chamber that are adjusted in a combustion engine that has the operating temperature;

wherein in working cycles of the combustion engine that follow a cold start, at least one first exhaust valve of at least one first combustion chamber is initially closed only at such a late point that its opening duration overlaps with the opening duration of a second exhaust valve of a second combustion chamber that immediately follows the first combustion chamber in the ignition sequence and that discharges into the same exhaust manifold as the first combustion chamber.

2. The method as recited in claim 1, wherein a switch first takes place to a split injection, in which a portion of the fuel is injected only in the compression cycle of the combustion chamber.

3. The method as recited in claim 1, wherein an operating-point shift is initiated by increasing the combustion-chamber charge and simultaneously or subsequently retarding the ignition angle.

4. The method as recited in claim 1, wherein the gas-exchange valve control device is used for an adjustment of the valve opening of the second exhaust valve of the second combustion chamber.

5. The method as recited in claim 1, further comprising:
additionally adjusting the valve opening of the first exhaust valve of the first combustion chamber, the additional adjustment always taking place in such a way that in the working cycles of the combustion engine that follow a cold start, at least one first exhaust valve of at least one first combustion chamber is closed at such a late point that its opening duration overlaps with the opening duration of a second exhaust valve of a second combustion chamber that immediately follows the first combustion chamber in the ignition sequence and that discharges into the same exhaust manifold as the first combustion chamber.

6. The method as recited in claim 1, wherein a positive scavenging gradient is adjusted subsequently.

7. The method as recited in claim 6, wherein the injection quantity is increased and the mixture is enriched as a result.

8. The method as recited in claim 7, wherein an achieved adjustment state of different final control elements is maintained until a catalytic converter in the exhaust-gas system has reached a light-off temperature, and the adjustment states of the different final control elements achieved after the cold start are canceled in a reverse order, and a transition takes place to a normal operation.

9. A control unit designed to operate a combustion engine following a cold start, the combustion engine having a supercharger device, at least two combustion chambers, a fuel-injection device that injects directly into each combustion chamber at least once per working cycle, and a gas-exchange valve control device that controls gas-exchange valves in a variable manner, the control unit controlling the fuel-injection device in such a way that a rich fuel-air mixture is generated in the respective combustion chamber by a fuel quantity injected per working cycle, and the control unit ignites the combustion-chamber charges produced in this manner in the respective working cycle at a later point than charges of the same combustion chambers in a combustion engine that has the operating temperature, under otherwise identical conditions, and after the cold start, the control unit operates the combustion engine with first valve overlaps of intake-valve openings and discharge-valve openings of one of the combustion chambers in each case, the first valve overlaps being greater than second valve overlaps of intake-valve openings and discharge-valve openings of the respective combustion chamber that are adjusted in a combustion engine that has the operating temperature, wherein in working cycles of the combustion engine that follow a cold start, the control unit initially closes at least one first exhaust valve of at least one first combustion chamber only at such a late point that its opening duration overlaps with the opening duration of a second exhaust valve of a second combustion chamber that immediately follows the first combustion chamber in the ignition sequence and that discharges into the same exhaust manifold as the first combustion chamber.

* * * * *